March 29, 1938.  A. J. LOEBS  2,112,602
AIR INJECTOR FOR INTERNAL COMBUSTION ENGINES
Filed Aug. 30, 1935
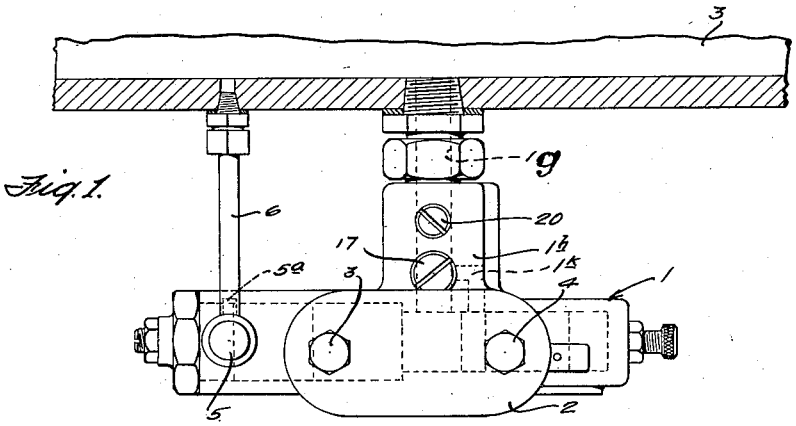
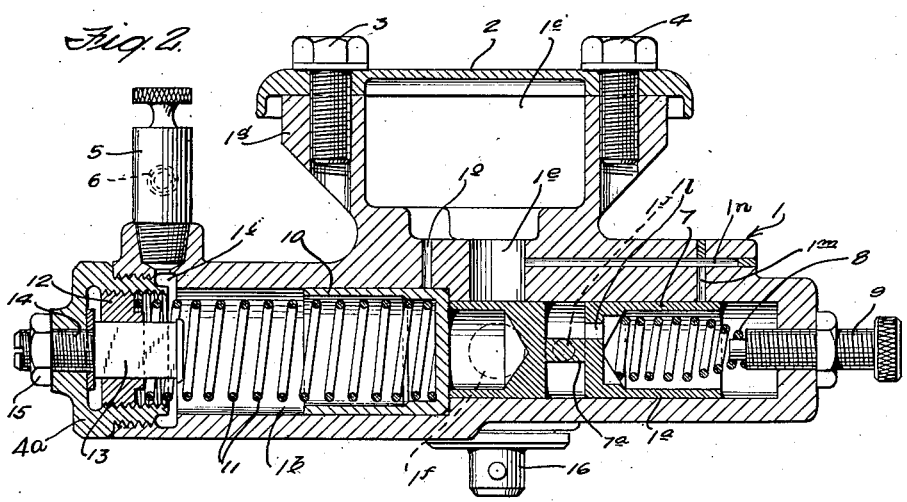
INVENTOR.
ALBERT J. LOEBS.
BY
ATTORNEY Patented Mar. 29, 1938

2,112,602

UNITED STATES PATENT OFFICE 2,112,602

AIR INJECTOR FOR INTERNAL COMBUSTION ENGINES

Albert J. Loebs, Long Island City, N. Y.

Application August 30, 1935, Serial No. 38,501

5 Claims. (Cl. 137—153)

The invention herein disclosed relates to an air injector for internal combustion engines and in particular to a device which may be termed an auxiliary carburetor for admitting additional air to the intake manifold of an internal combustion engine.

The ideal mixture of gasoline and air for internal combustion engines varies with the conditions of operation of the engine. Normally, the carburetors utilized have a set ratio in the mixture of gasoline and air. And, it is an object of this invention to provide an auxiliary device by means of which additional air is injected into the manifold of an internal combustion engine during those conditions of operation in which the ratio of air to gasoline may be increased beyond that provided by the carburetor.

In accordance with the invention, there is provided a case which has an air inlet and an air exhaust opening. The exhaust opening is adapted to be connected to the intake manifold of an internal combustion engine and its communication with the intake opening is controlled by a valve. The operation of the valve is in turn controlled by the reduction in pressure of the intake manifold of the internal combustion engine such that under certain conditions of operation of the internal combustion engine, the intake and exhaust ports of the device are placed into communication. The valve is continually urged towards a position, with reference to its inoperative position, to place the intake and exhaust ports of the device in communication and thus admit air to the intake manifold of the engine. Movement of the valve in this direction is resisted by a force greater than that urging the valve to the open position. The resistance offered the valve in its movement is increased or decreased in accordance with the reduction in pressure in the intake manifold of the internal combustion engine to which it is attached. Such a device is illustrated in the accompanying drawing in which:

Fig. 1 is a plan view thereof illustrating its connection to the intake manifold of an internal combustion engine;

Fig. 2 is a longitudinal, sectional elevation thereof; and

Fig. 3 is a central, sectional, side elevation thereof.

The device illustrated in the drawing includes a casing 1 having a longitudinal bore 1a forming a valve chamber and extending partly through the case. A bore of larger diameter 1b forms a continuation of the valve chamber 1a, the bores 1a and 1b extending the entire length of the case. An air chamber 1c is formed in the case in an extension 1d extending from the top of the case and formed integral with the case. The air chamber 1c is closed by a cover 2 secured to the case by bolts 3 and 4. The cover 2 includes a central rib 2a so that the flange 2b of the cover is spaced from the case to permit the free passage of air from the outside to the chamber 1c. The chamber 1c communicates with the valve chamber 1a through a passage 1e which forms the air inlet port to the valve chamber. An air exhaust port 1f is spaced 90° from the air inlet port 1e and communicates with a passage 1g extending through a lateral extension 1h of the case. The lateral extension 1h has a threaded end portion which is screwed into an opening in the manifold 3 of an internal combustion engine. One end of the valve chamber is closed by the end of the casing and the outside end of the piston chamber 1b is closed by a cap 4a having an extension threaded into the end of the case. Adjacent this cap there is a port 1i which communicates with an internally threaded passage in which there is received one end of an ordinary needle valve 5. The needle valve has an extension 5a which is connected by means of a tube 6 to the intake manifold 3 of the internal combustion engine and the needle valve controls communication between the intake manifold and the port 1i. The needle valve is provided for the purpose of regulating the reduction of pressure in the port 1i and consequently the piston chamber 1b.

Within the valve chamber 1a there is a piston valve 7 which has a reduced central portion 7a through which the ports 1e and 1f may be placed in communication so that air may pass from the atmosphere to the intake manifold of the internal combustion engine. Behind the valve, there is a spring 8 one end of which extends into the valve and abuts against the end of a recess in the valve and the other end of which is received on the end of a set screw 9 threaded into an opening in the end wall of the valve chamber. The spring 8 thus tends to urge the valve to the left as seen in Figure 2. In Figure 2 the valve is shown in the position it occupies when the internal combustion engine to which the device is attached is not operating. It will thus be noted that the spring 8 tends to move the valve towards a position to place the ports 1e and 1f into communication with reference to its inoperative position. The set screw 9 is provided for adjusting the force with which the spring 8 acts upon the valve.

Movement of the valve under the action of the spring 8 is resisted by a hollow, cup-shaped piston 10 the end face of which abuts against the end of the piston valve. The piston 10 is mounted in the piston chamber 1b and it is urged in a direction of the valve by a spring 11 one end of which abuts against the rear face of the piston and the other end of which is received on a threaded boss 12. The threaded boss 12 is received within and engages internal threads in the cap 4a and has a square opening through the center thereof through which extends a squared pin 13. The pin 13 includes a circular end portion 14 which is rotatably mounted in an opening in the end of the cap. The end of this threaded portion is grooved to receive a screw-driver and a lock-nut 15 secures the pin 13 against rotation. The force or tension of the spring 11 may be adjusted by loosening the lock-nut 15 and turning the pin 13. Rotation of the pin 13 causes the bushing 12 to rotate and be advanced or withdrawn along the internal threads of the cap 4a thus contracting or permitting the spring 11 to expand and adjusting the force exerted by the spring on the piston 10.

The port 1i is behind the piston 10 so that a reduction in pressure in this port causes a reduction in pressure in the piston chamber 1b and tends to withdraw the piston 10 against the action of the spring 11. When suction in the manifold of the internal combustion engine is such that the reduction in pressure in the piston chamber 1b is sufficient, the piston 10 is withdrawn against the action of the spring 11. Normally, the piston valve 7 follows the action of the piston 10. However, for the purpose of retarding movement of the piston valve 7 when the engine is being started or while it is idling, there is provided a port 1j which communicates through a passage 1k with the passage 1g. Thus suction in the exhaust manifold causes a reduction in pressure in the passage 1g, the passage 1k and the port 1j. A passage 1l through the piston valve 7 places the port 1j into communication with the chamber formed behind the piston valve and consequently causes a reduction in pressure in this chamber when there is a reduction in pressure in the passage 1g. This reduction in pressure is sufficient to overcome the action of the spring 8 when the motor is being started or when it is idling. When the motor is speeded up or the throttle opened and the reduction in pressure caused by the suction in the manifold is decreased, the spring 8 causes the valve 7 to follow the piston 10 and opens a port 1m which is connected through a passage 1n with the air inlet passage 1e. The chamber behind the piston valve is thus opened to the atmosphere and it is maintained against the piston 10 by the spring 8 and follows the movement of the piston 10. To prevent the piston 10 from becoming air-bound, there is provided a passage 1o which communicates with the air chamber 1c.

From the above it will be seen that when the device is connected to an internal combustion engine in the manner described the valve 7 will close communication between the air inlet and air exhaust ports of the auxiliary carburetor. This condition will exist while the suction in the intake manifold remains at a particular value. When the suction varies, the piston 10 will be moved and the valve 7 will be caused to follow the piston 10 so that when the engine is running at normal speeds air will be admitted to the intake manifold through the auxiliary carburetor. If the suction becomes abnormal the piston valve 7 will pass beyond the point in which it opens communication between the inlet and exhaust ports and close these ports. Likewise when the throttle is opened wide the suction in the manifold decreases and the spring 11 overcomes the reduction in pressure in the piston chamber 1b and causes the piston 10 to move the valve 7 to a closed position. The needle valve 5 and the tension of the spring 11 may be regulated to procure the best operating results.

In the lateral extension 1h which contains the passage 1g, there is a petcock 16 by means of which the passage 1g can be closed and thus the auxiliary carburetor put out of operation. Extending through the center of this petcock there is a set screw 17. The set screw 17 is capable of extending into the passage 1g and is provided for the purpose of adjusting the size of that passage so that the device may be adjusted to various sized internal combustion engines. A spring 18 surrounding the set screw and abutting against the head thereof and the casing maintains the set screw in a position in which it is set.

The extension 1h is tapped at 19 which tap is normally closed by a plug 20 and which is provided for the purpose of connecting auxiliary devices operated from the intake manifold such as wind-shield wipers and the like.

It will be obvious that various changes may be made by those skilled in the art in the details of the embodiment of the invention illustrated in the drawing and described in detail above within the principle and scope of the appended claims.

I claim:

1. In an auxiliary air regulator for an internal combustion engine, a casing forming a chamber and having an inlet and an exhaust port, the exhaust port being adapted to be connected to the intake manifold of an internal combustion engine, a valve within the chamber for controlling communication between the inlet and exhaust ports, a piston secured to the valve, means urging the valve towards a position to open communication between the inlet and exhaust ports, means acting to restrain movement of the valve under the action of said first mentioned means, a second piston within the chamber operative to relieve the valve of the action of said restraining means upon a reduction in pressure in the chamber behind the said second piston, and the casing having a port behind the said second mentioned piston adapted to be connected to the intake manifold of an internal combustion engine, and a port communicating with the chamber behind the piston connected to the valve and connected to the exhaust port of the casing.

2. In an auxiliary air regulator for an internal combustion engine, a casing forming a chamber and having an inlet and an exhaust port, the exhaust port being adapted to be connected to the intake manifold of an internal combustion engine, a valve within the chamber for controlling communication between the inlet and exhaust ports, a piston secured to the valve, means urging the valve towards a position to open communication between the inlet and exhaust ports, means acting to restrain movement of the valve under the action of said first mentioned means, a second piston within the chamber operative to relieve the valve of the action of said restraining means upon a reduction in pressure in the chamber behind the said second piston, and the casing having a port behind the said second mentioned piston adapted to be connected to the intake manifold of an internal combustion engine, a port communicating with the chamber behind the piston connected to the valve and communicating with the exhuast port and another port covered by the piston secured to the valve in the normal closed position of the valve, said latter port communicating with the inlet.

3. In an auxiliary air regulator for an internal combustion engine, a casing forming a chamber and having an inlet and exhaust port, the exhaust port being adapted to be connected to the intake manifold of an internal combustion engine, a piston valve within the chamber for controlling communication between the inlet and exhaust ports, a spring urging the piston valve in a direction from its normal inoperative position to open communication between the inlet and exhaust ports, a piston normally abutting against the piston valve, and a spring acting upon the piston to resist movement of the valve under the force of said first mentioned spring, the casing having a port for connecting the portion of the chamber behind said piston to the intake manifold of an internal combustion engine, a port for connecting the portion of the chamber behind said piston valve to the exhaust port of the casing, and a port controlled by the piston valve for opening the portion of the chamber behind said piston valve to the atmosphere.

4. In an auxiliary air regulator for an internal combustion engine, a casing forming a chamber and having an inlet and exhaust port, the exhaust port being adapted to be connected to the intake manifold of an internal combustion engine, means for adjusting the size of the exhaust port, a piston valve within the chamber for controlling communication between the inlet and exhaust ports, a spring urging the piston valve in a direction from its normal inoperative position to open communication between the inlet and exhaust ports, a piston normally abutting against the piston valve, and a spring acting upon the piston to resist movement of the valve under the force of said first mentioned spring, the casing having a port for connecting the portion of the chamber behind said piston to the intake manifold of an internal combustion engine, a port for connecting the portion of the chamber behind said piston valve to the exhaust port of the casing, and a port controlled by the piston valve for opening the portion of the chamber behind said piston valve to the atmosphere.

5. In an auxiliary air regulator for an internal combustion engine, a casing forming a chamber and having an inlet and exhaust port, the exhaust port being adapted to be connected to the intake manifold of an internal combustion engine, means for adjusting the size of the exhaust port, a piston valve within the chamber for controlling communication between the inlet and exhaust ports, a spring urging the piston valve in a direction from its normal inoperative position to open communication between the inlet and exhaust ports, a piston normally abutting against the piston valve, and a spring acting upon the piston to resist movement of the valve under the force of said first mentioned spring, the casing having a port for connecting the portion of the chamber behind said piston to the intake manifold of an internal combustion engine, a port for connecting the portion of the chamber behind said piston valve to the exhaust port of the casing, and a port controlled by the piston valve for opening the portion of the chamber behind said piston valve to the atmosphere, and means for regulating the passage of air through the port communicating with the chamber behind said piston.

ALBERT J. LOEBS.